(12) United States Patent
Hart et al.

(10) Patent No.: US 8,213,356 B2
(45) Date of Patent: *Jul. 3, 2012

(54) COMMUNICATION SYSTEMS

(75) Inventors: Michael John Beems Hart, London (GB); Yuefeng Zhou, Oxshott (GB); Sunil Keshavji Vadgama, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 410 days.

This patent is subject to a terminal disclaimer.

(21) Appl. No.: 12/301,414

(22) PCT Filed: Jul. 31, 2007

(86) PCT No.: PCT/GB2007/002902
§ 371 (c)(1),
(2), (4) Date: Jun. 18, 2009

(87) PCT Pub. No.: WO2008/040931
PCT Pub. Date: Apr. 10, 2008

(65) Prior Publication Data
US 2010/0002619 A1 Jan. 7, 2010

(30) Foreign Application Priority Data
Oct. 2, 2006 (GB) .................................. 0619454.2

(51) Int. Cl.
*H04W 4/00* (2009.01)
(52) U.S. Cl. ........................................ 370/328; 370/474
(58) Field of Classification Search .................. 370/310, 370/310.1, 310.2, 315, 316, 326, 328, 229, 370/335, 342, 343, 329, 336, 431, 464, 474, 370/480, 498; 455/7, 15, 16
See application file for complete search history.

(56) References Cited

U.S. PATENT DOCUMENTS
4,261,054 A    4/1981   Scharla-Nielsen
(Continued)

FOREIGN PATENT DOCUMENTS
CA       2556681        9/2005
(Continued)

OTHER PUBLICATIONS

IEEE 802.16 2004 "IEEE Standard for Local and Metropolitan Area Networks. Part 16: Air Interface for Fixed Broadband Wireless Access Systems." Dated Oct. 1, 2004.

(Continued)

*Primary Examiner* — Kwang B Yao
*Assistant Examiner* — Obaidul Huq
(74) *Attorney, Agent, or Firm* — Murphy & King, P.C.

(57) ABSTRACT

A downlink transmission method for use in a multi-hop communication system, the system comprising a base station (BS), a mobile station (MS) and one or more relay stations (RS), and the system providing two or more different communication paths extending between the base station and the mobile station, the base station being operable to transmit information indirectly to the mobile station along a series of links forming a first such communication path via one or more of said relays and also being operable to transmit information to the mobile station along one link or a series of links forming a second such communication path; the method comprising transmitting particular information from the base station along the first and second communication paths and combining the same particular information transmitted along the first and second communication paths in the mobile station.

18 Claims, 6 Drawing Sheets

U.S. PATENT DOCUMENTS

| | | | |
|---|---|---|---|
| 5,029,164 A | 7/1991 | Goldstein | |
| 5,293,639 A | 3/1994 | Wilson | |
| 5,592,154 A | 1/1997 | Lin | |
| 5,724,659 A | 3/1998 | Daniel | |
| 6,002,690 A | 12/1999 | Takayama | |
| 6,678,248 B1 | 1/2004 | Haddock | |
| 6,907,212 B2 | 6/2005 | Harada | |
| 7,184,703 B1 | 2/2007 | Naden | |
| 7,376,122 B2 | 5/2008 | Draves | |
| 7,400,856 B2 | 7/2008 | Sartori et al. | |
| 7,454,244 B2 | 11/2008 | Kassab | |
| 7,574,230 B1 | 8/2009 | Oh | |
| 7,609,631 B2 | 10/2009 | Stanwood | |
| 7,738,859 B2 | 6/2010 | Roy | |
| 7,865,146 B2 | 1/2011 | Hart | |
| 7,881,741 B2 | 2/2011 | Horiuchi et al. | |
| 7,983,151 B2 * | 7/2011 | Hart et al. | 370/218 |
| 8,000,651 B2 | 8/2011 | Horiuchi et al. | |
| 2002/0039383 A1 | 4/2002 | Zhu | |
| 2002/0115409 A1 | 8/2002 | Khayrallah | |
| 2002/0115440 A1* | 8/2002 | Hamabe | 455/442 |
| 2003/0097460 A1 | 5/2003 | Higashiyama | |
| 2003/0123401 A1 | 7/2003 | Dean | |
| 2003/0125067 A1 | 7/2003 | Takeda | |
| 2003/0156554 A1 | 8/2003 | Dillinger | |
| 2003/0165127 A1 | 9/2003 | Fujiwara | |
| 2003/0202476 A1 | 10/2003 | Billhartz | |
| 2004/0001464 A1 | 1/2004 | Adkins | |
| 2004/0123229 A1* | 6/2004 | Kim et al. | 714/800 |
| 2004/0219876 A1 | 11/2004 | Baker | |
| 2004/0266339 A1 | 12/2004 | Larsson | |
| 2005/0014464 A1 | 1/2005 | Larsson | |
| 2005/0048914 A1 | 3/2005 | Sartori | |
| 2005/0048983 A1 | 3/2005 | Abraham | |
| 2005/0063356 A1 | 3/2005 | Larsen | |
| 2005/0213587 A1 | 9/2005 | Cho | |
| 2005/0249162 A1* | 11/2005 | Kim et al. | 370/333 |
| 2005/0249164 A1 | 11/2005 | Kwak | |
| 2005/0272366 A1* | 12/2005 | Eichinger et al. | 455/9 |
| 2005/0288020 A1* | 12/2005 | Cho et al. | 455/436 |
| 2006/0040697 A1 | 2/2006 | Komatsu | |
| 2006/0067243 A1 | 3/2006 | Bejerano | |
| 2006/0209671 A1 | 9/2006 | Khan | |
| 2006/0227796 A1 | 10/2006 | Wei | |
| 2006/0264172 A1 | 11/2006 | Izumikawa | |
| 2007/0066239 A1 | 3/2007 | Hart | |
| 2007/0066240 A1 | 3/2007 | Hart | |
| 2007/0066241 A1 | 3/2007 | Hart | |
| 2007/0066337 A1 | 3/2007 | Hart | |
| 2007/0081507 A1 | 4/2007 | Koo | |
| 2007/0116106 A1 | 5/2007 | Hart | |
| 2008/0009243 A1 | 1/2008 | Hart | |
| 2008/0049718 A1* | 2/2008 | Chindapol et al. | 370/351 |
| 2008/0165720 A1 | 7/2008 | Hu | |
| 2008/0225774 A1 | 9/2008 | Kim | |
| 2009/0185479 A1* | 7/2009 | Hart et al. | 370/218 |
| 2010/0110973 A1 | 5/2010 | Hart | |
| 2010/0111027 A1 | 5/2010 | Hart | |

FOREIGN PATENT DOCUMENTS

| | | |
|---|---|---|
| CN | 1859364 A | 11/2006 |
| EP | 1388936 A2 | 2/2004 |
| EP | 1753188 A1 | 2/2007 |
| EP | 1761080 A1 | 3/2007 |
| EP | 1773091 A2 | 4/2007 |
| EP | 1801995 A1 | 6/2007 |
| GB | 2440982 | 2/2008 |
| GB | 2440984 | 2/2008 |
| GB | 2440985 | 2/2008 |
| GB | 2443466 A | 5/2008 |
| GB | 2443465 A | 7/2008 |
| JP | 6505371 | 8/1992 |
| JP | 2002185382 A | 6/2002 |
| JP | 2003124876 A | 4/2003 |
| JP | 2003258719 A | 9/2003 |
| JP | 2004032393 A | 1/2004 |
| JP | 2004173123 A | 6/2004 |
| JP | 2005033625 A | 2/2005 |
| JP | 2005142676 A | 6/2005 |
| JP | 2005142968 A | 6/2005 |
| JP | 2005159900 A | 6/2005 |
| KR | 1020030049031 A | 6/2003 |
| WO | 9214309 A1 | 8/1992 |
| WO | 9746038 A2 | 12/1997 |
| WO | 9836509 | 8/1998 |
| WO | 0077948 A1 | 12/2000 |
| WO | 0150635 A1 | 7/2001 |
| WO | 0163849 A2 | 8/2001 |
| WO | 03044970 A2 | 5/2003 |
| WO | 2004107693 A1 | 12/2004 |
| WO | 2005025110 A3 | 3/2005 |
| WO | 2005064872 A1 | 7/2005 |
| WO | 2005053338 | 9/2005 |
| WO | 2005088914 | 9/2005 |
| WO | 2006020032 A1 | 2/2006 |
| WO | 2006080507 A1 | 8/2006 |
| WO | 2006099024 A2 | 9/2006 |
| WO | 2006101013 A1 | 9/2006 |
| WO | 2006130964 A1 | 12/2006 |
| WO | 2007003142 A1 | 1/2007 |
| WO | 2007019672 A1 | 2/2007 |

OTHER PUBLICATIONS

Apostolopoulos, J.G. et. al. "Source-Channel Diversity for Parallel Channels" IEEE Transactions on Information Theory, IEEE Service Center, Piscataway, NJ, US, vol. 51, No. 10, Oct. 2005, pp. 3518-3539, XP011139661.

IEEE 802.11a/g standard: "Wireless LAN Medium Access Control (MAC) and Physical Layer (PHY) specifications".

International Search Report for PCT/GB2007/002902 (dated Nov. 24, 2008).

IEEE St. 802.16e 2005 "IEEE Standard for Local and Metropolitan Area Networks. Part 16: Air Interface for Fixed and Mobile Broadband Wireless Access Systems. Amendment 2: Physical and Medium Access Control Layers for Combined Fixed and Mobile Operation in Licensed Bands." Dated Feb. 28, 2006.

European Search Report dated Feb. 2, 2011 received in corresponding EP06252979.7.

Christian Hoymann et al. "Multihop Communication in Relay Enhanced IEEE 802.16 Networks" Personal, Indoor and Mobile Radio Communications, 2006 IEEE 17th International Symposium on, IEEE, PI Sep. 11, 2006, pp. 1-4, XP002462917 the whole document.

Daehyon Kim, et al. "Fair and efficient multihop scheduling algorithm for IEEE 802.16 BWA systems" Broadband Networks, 2005 2nd International Conference onMA Oct. 3-7, 2005, Piscataway, NJ, USA, IEEE pp. 895-901 the whole document.

Extended European Search Report dated Mar. 1, 2010 received in corresponding European Patent No. 09172393.2-2416/2141870.

International Search Report issued in PCT/GB2007/002909 dated Mar. 2, 2007.

Kaneko S. et al, "Proposed Relay Method with P-MP Structure of IEEE 802.16-2004" Personal, Indoor and Mobile Radio Communications, 2005. PIMRC 2005, IEEE 16th International Symposium on Berlin, Germany Sep. 11-14, 2005, Piscataway, NJ, USA, IEEE, pp. 1606-1610, XP010926479 Paragraph [0011]—paragraph [00IV].

Non-Final Office Action dated Mar. 21, 2011 received in U.S. Appl. No. 12/226,344.

Search Report Issued in Priority United Kingdom application No. 0704093.4 dated Jul. 3, 2007.

United Kingdom Search Report dated Apr. 19, 2007 for application No. GB0705225.1.

United Kingdom Search Report dated May 23, 2007 for application No. GB0705225.1.

Non-Final Office Action dated Jun. 22, 2011 received in U.S. Appl. No. 11/637,025.

Non-Final Office Action dated Jun. 16, 2011 received in U.S. Appl. No. 11/454,028.

Final Office Action dated Jun. 23, 2011 received in U.S. Appl. No. 11/453,045.

Non-Final Office Action dated Jun. 27, 2011 received in U.S. Appl. No. 12/226,319.
Non-Final Office Action dated May 20, 2011 received in U.S. Appl. No. 12/973,086.
Notice of Allowance dated May 23, 2011 received in U.S. Appl. No. 11/453,839.
Final Office Action dated May 17, 2011 received in U.S. Appl. No. 11/453,055.
Japanese Office Action date May 10, 2011 received in JP2006-167984.
Notice of Allowance dated Jul. 28, 2011 received in U.S. Appl. No. 11/453,839.
Japanese Office Action dated May 24, 2011 received in JP2006342666.
Japanese Office Action dated May 31, 2011 received in JP2006167981.
Japanese Office Action dated May 10, 2011 received in JP2006-167982.
Japanese Office Action dated Jun. 14, 2011 received in JP2009-535780.
Japanese Office Action dated Jun. 28, 2011 received in JP2009-091469.
Chinese Office Action dated Aug. 12, 2011 received in 200780033647.2.
Office Action dated Jul. 5, 2011 received in corresponding Japanese Patent Application No. 2009-091471.
Japanese Office Action dated Feb. 1, 2011 received in corresponding Japanese Patent Application 2006167985.
Japanese Office Action dated May 10, 2011 received in corresponding Japanese Patent Application 2006167983.
Final Office Action dated Oct. 14, 2011 received in U.S. Appl. No. 12/226,319.
Final Office Action dated Oct. 25, 2011 received in U.S. Appl. No. 12/226,344.
Non-Final Office Action dated Oct. 31, 2011 received in U.S. Appl. No. 12/301,414.
Notice of Allowance dated Nov. 7, 2011 received in U.S. Appl. No. 11/453,839.
Notification of Reason for Refusal dated Sep. 6, 2011 received in corresponding Japanese Patent Application 2006167986.
Final Office Action dated Sep. 29, 2011 received in U.S. Appl. No. 11/454,016.
Notice of Allowance dated Sep. 28, 2011 received in U.S. Appl. No. 12/973,086.
Notice of Allowance dated Nov. 23, 2011 received in U.S. Appl. No. 12/973,086.
Non-Final Office Action dated Jul. 16, 2009 received in U.S. Appl. No. 11/453,055.
British Search Report for Application No. GB0622120.4 dated Dec. 6, 2006.
Communication dated Sep. 30, 2008 forwarding Extended European Search Report in European Application No. 08151572.8-1246 with abstract and narrative.
European Search Report; EP 0525 3768 dated Oct. 14, 2005.
European Search Report: EP 05253784 dated Oct. 17, 2005.
European Search Report: EP 0525 3767 dated Oct. 17, 2005.
European Search Report; EP 05253785 dated Oct. 19, 2005.
European Search Report; EP 05253766 dated Oct. 13, 2005.
Advisory Action dated Jul. 2, 2010 received in U.S. Appl. No. 11/453,055.
European Office Action issued Jan. 17, 2011 in application 07 766 391.2-2415.
First Notice of Office Action in corresponding 200610095607.8 dated Feb. 6, 2009.
IEEE Std. 802.11g-2003 IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 Ghz Band IEEE Computer Society , Jun. 27, 2003.
Non-Final Office Action dated Jun. 16, 2010 received in U.S. Appl. No. 12/613,367.
Non-Final Office Action dated Aug. 23, 2010 rec'd in U.S. Appl. No. 12/613,342.
Final Office Action dated Mar. 9, 2011 received in U.S. Appl. No. 12/613,342.
Non-Final Office Action dated Nov. 29, 2010 received in U.S. Appl. No. 11/453,055.
International Search Report PCT/GB2007/002891 dated Oct. 25, 2007.
Sreng V. et al.: Relayer selection strategies in cellular networks with peer-to-peer relaying, Vehicular Technology Conference, 2003. 2003 IEEE 58th Orlando, Fl., USA Oct. 6-9, 2003, Piscataway, NJ, USA, IEEE, US, Oct. 6, 2003, pp. 1949-1953.
Zhang Jingmei et al.: "Adaptive optimal transmit power allocation for two-hop non-regenerative wireless relaying system", Vehicular Technology Conference, 2004. VTC 2004-spring. 2004 IEEE 59th Milan, Italy May 17-19, 2004, Piscataway, NJ, USA, IEEE, US, vol. 2, May 17, 2004, pp. 1213-1217.
First Notification of Office Action dated Apr. 3, 2009 received in corresponding Chinese Application No. 200610172053.7.
Non-Final Office Action dated Apr. 9, 2009 received in U.S. Appl. No. 11/454,016.
Non-Final Office Action dated Jan. 5, 2010 received in U.S. Appl. No. 11/637,025.
Final Office Action dated Jul. 6, 2010 received in U.S. Appl. No. 11/637,025.
Final Office Action dated Jun. 16, 2010 received in U.S. Appl. No. 11/453,844.
Non-Final Office Action dated Sep. 30, 2009 received in U.S. Appl. No. 11/453,844.
Notice of Allowance dated Oct. 22, 2010 received on U.S. Appl. No. 11/453,844.
Extended European Search Report dated Feb. 8, 2011 received in 09173072.1-1246/2144466.
Extended European Search Report dated Feb. 14, 2011 received in 09173073.9-1246/2144472.
Extended European Search Report dated Feb. 14, 2011 received in 09173074.7-1246/2144473.
Notice of Allowance dated Jan. 13, 2011 received in U.S. Appl. No. 11/453,839.
Final Office Action dated Dec. 15, 2009 received in U.S. Appl. No. 11/454,016.
Non-Final Office Action dated Jun. 8, 2010 received in U.S. Appl. No. 11/453,839.
Non-Final Office Action dated Dec. 9, 2010 received in U.S. Appl. No. 11/454,016.
Final Office Action dated Jan. 25, 2011 received in U.S. Appl. No. 12/613,367.
Non-Final Office Action dated Jun. 30, 2010 received in U.S. Appl. No. 11/454,028.
Non-Final Office Action dated Apr. 10, 2009 received in U.S. Appl. No. 11/454,028.
Final Office Action dated Dec. 15, 2009 received in U.S. Appl. No. 11/454,028.
Final Office Action dated Dec. 28, 2010 received in U.S. Appl. No. 11/454,028.
Advisory Action dated Apr. 29, 2010 received in U.S. Appl. No. 11/454,028.
Non-Final Office Action dated Dec. 1, 2009 received in U.S. Appl. No. 11/453,045.
Non-Final Office Action dated Jan. 6, 2011 received in U.S. Appl. No. 11/453,045.
Final Office Action dated Aug. 2, 2010 received in U.S. Appl. No. 11/453,045.
Final Office Action dated Mar. 24, 2010 received in U.S. Appl. No. 11/453,055.
European Search Report dated Oct. 18, 2005 received in EP05253783.
Final Office Action dated May 2, 2011 received in U.S. Appl. No. 11/454,016.
Notice of Allowance dated Apr. 26, 2011 received in U.S. Appl. No. 11/453,839.
Decision of Refusal dated Oct. 11, 2011 received in Japanese Patent Application No. 2006-167982.

Decision of Refusal dated Oct. 11, 2011 received in Japanese Patent Application No. 2006-167984.
Non-Final Office Action dated Feb. 7, 2012 received in U.S. Appl. No. 12/613,342.
Non-Final Office Action dated Jan. 12, 2012 received in U.S. Appl. No. 12/613,367.
Notice of Allowance dated Jan. 19, 2012 received in U.S. Appl. No. 11/454,028.
Non-Final Office Action dated Jan. 26, 2012 received in U.S. Appl. No. 12/226,319.
Non-Final Office Action dated Feb. 13, 2012 received in U.S. Appl. No. 12/226,344.
Notice of Allowance dated Dec. 22, 2011 received in U.S. Appl. No. 11/453,839.
Japanese Office Action dated Mar. 21, 2012 received in JP2009-530924.

* cited by examiner

Basic procedure of MS HARQ operations in relay enabled networks

Example TDD frame structure from OFDMA physical layer of the IEEE802.16 standard

COMMUNICATION SYSTEMS

Currently there exists significant interest in the use of multihop techniques in packet based radio and other communication systems, where it is purported that such techniques will enable both extension in coverage range and increase in system capacity (throughput).

In a multi-hop communication system, communication signals are sent in a communication direction along a communication path (C) from a source apparatus to a destination apparatus via one or more intermediate apparatuses. FIG. 2 illustrates a single-cell two-hop wireless communication system comprising a base station BS (known in the context of 3 G communication systems as "node-B" NB) a relay node RN (also known as a relay station RS) and a user equipment UE (also known as mobile station MS or user terminal). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 3 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 3 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 3 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L=b+10n\log d \quad (A)$$

Where d (meters) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI)+L(ID)<L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \ 0 \leq t \leq T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \epsilon C_n$, $c = (c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 standard incorporates both an FDD and TDD mode. IEEE Standard 802.16-2004 "Air Interface for Fixed Broadband Wireless Access Systems" and the 2005 update are hereby incorporated by reference in their entirety.

As an example, FIG. 4 illustrates the single hop TDD frame structure used in the OFDMA physical layer mode of the IEEE802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

The invention is defined in the independent claims, to which reference should now be made. Advantageous embodiments are set out in the sub claims.

In legacy single hop systems (e.g. 802.16-2004 and 802.16e-2005), HARQ can be supported in both the up and downlinks. HARQ (Hybrid Automatic Repeat Request) is a method of error control in which there is an automatic re-transmission request when an error is detected. HARQ uses an error correction code, which is checked to scan for errors. If errors are found in the code, retransmission is requested.

In practice, the incorrectly received data is usually stored at the receiver and the retransmitted data combined with the old data (chase combining). In a development of chase combining known as incremental redundancy, the initial transmission and any retransmission are coded differently.

The inventors have come to the surprising realisation that it is possible to use the known chase combining HARQ detection procedure on the MS side, but adapt it for the case of relaying enabled networks where the MS can detect the transmission directly from the BS as well as receive the relayed version of the transmission or can receive multiple relayed signals. Thus the two transmissions combined are from different paths, rather than one being a retransmission of the other.

Such a situation could arise when the direct link is not sufficient in quality to support direct communication with the BS, or where excessive transmit power would be required from the BS. As a result the main path of communication is via the RS. However, it is possible that the MS can still detect the transmission from the BS.

It could also exist where the MS downlink cannot be reliably supported by just one RS or BS so the system attempts to facilitate communication with the MS through relaying the HARQ transmission through one or more RSs.

Preferred features of the present invention will now be described, purely by way of example, with reference to the accompanying drawings, in which:—

MODIFIED "HARQ" OPERATION

Figure 1A:
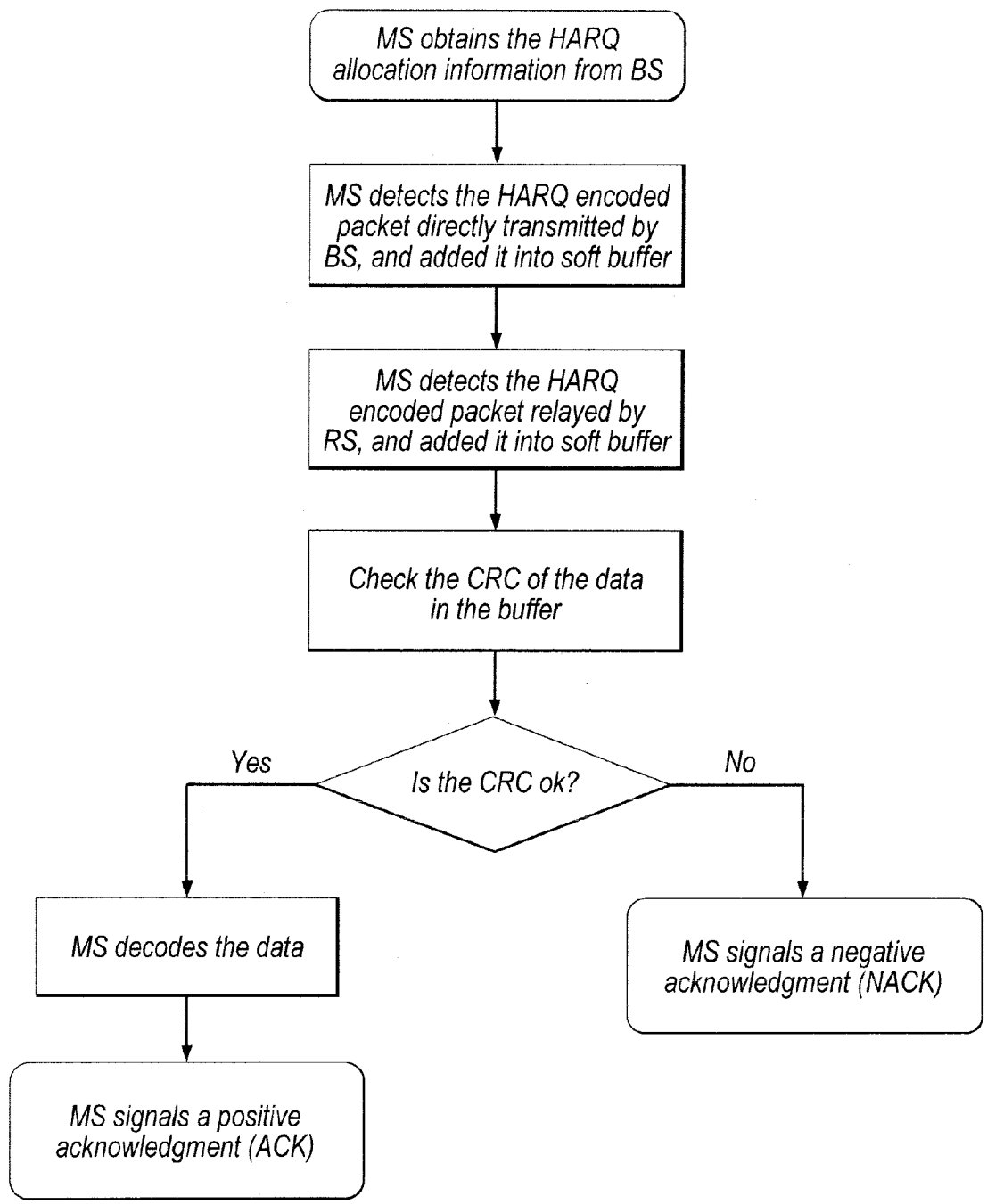
FIG. 1a shows basic procedure of MS HARQ type operations in relay enabled networks.

In a transparent relaying system where control is centralised at the BS, the BS will inform the MS of when it can expect to potentially receive the various versions (i.e. directly transmitted or relayed) of the information intended for it. Thus it is assumed that the MS will then exploit this knowledge and when using modified HARQ procedures will perform the following operations (as shown in FIG. 1a):

a. Receive the information from the BS informing it of when it can expect to receive the various transmissions of the HARQ packet intended for it;
b. Detect the initial transmission from the BS and store the received HARQ encoded packet (or subpacket in case of an IEEE 802.16 system) in the soft buffer without attempting decoding;
c. Detect the relayed transmission(s) from the RS(s) and add the received relayed HARQ encoded packet (or subpacket in case of an IEEE 802.16 system) into the soft buffer;
d. Check the cyclic redundancy check (CRC) sequence of the data in the buffer and decode the data if the CRC is OK; and
e. Follow the standard procedure taken in the case of a single hop system after CRC checking (i.e. signal either a positive (ACK) or negative (NACK) acknowledgement message to the BS, retaining the contents of the soft buffer if it is a NACK).

CRC check and data decoding is not proposed after stage 1 because the direct transmission is likely to be of low reliability, and it is therefore better to wait for the relayed signal (which will arrive whether or not the direct transmission is successful) before performing decoding. As a result no extra decoding complexity is incurred through using the proposed mechanism in the invention embodiments.

It is also possible to extend this mechanism for the case of the BS requesting more than one RS to relay the transmission within a frame. In this case the MS combines all of the different versions of the HARQ packet that can be received within one frame prior to attempting decoding.

Advantageously, the different versions are both received within one frame (or more precisely for IEEE 802.16 systems, one downlink subframe) which is a discrete time period for downlink transmission only. For an indication of how transmission over at least two hops in a multihop system can be carried out in a single subframe, the reader is referred to GB 0616477.6, GB 0616481.8 and GB 0616479.2, all of which are incorporated by reference and copies of which are filed herewith.

In a similar manner to the DL data, ACK/NACK (i.e. when using HARQ on the UL) and other messages from the BS (direct and relayed via one or more RSs) could also be chase combined at MS, potentially improving ACK/NACK and other signalling detection reliability.

Figure 1B:
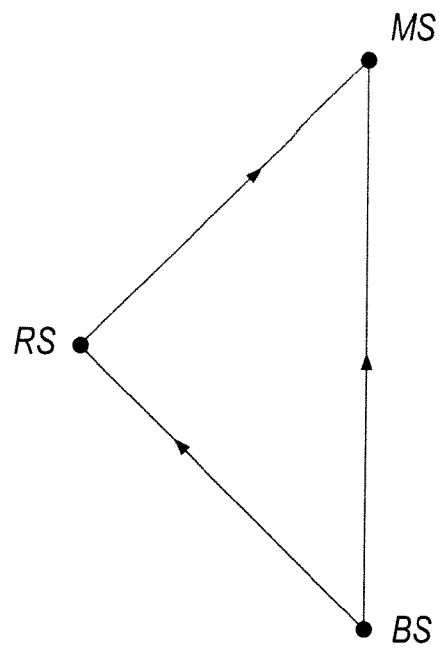
FIG. 1b shows a network configuration suitable for using the procedure.
Figure 1C:
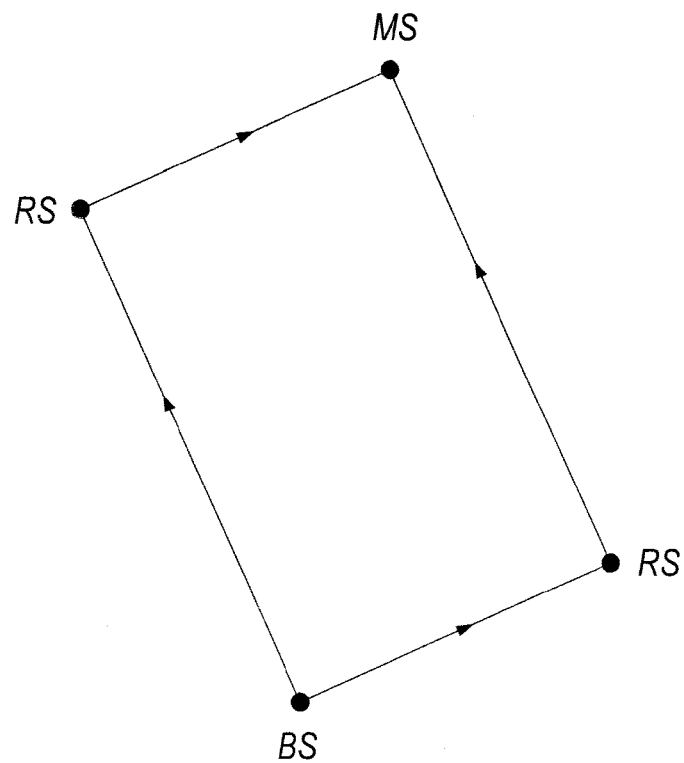
FIG. 1c shows an alternative configuration suitable for using the procedure.
Figure 2:
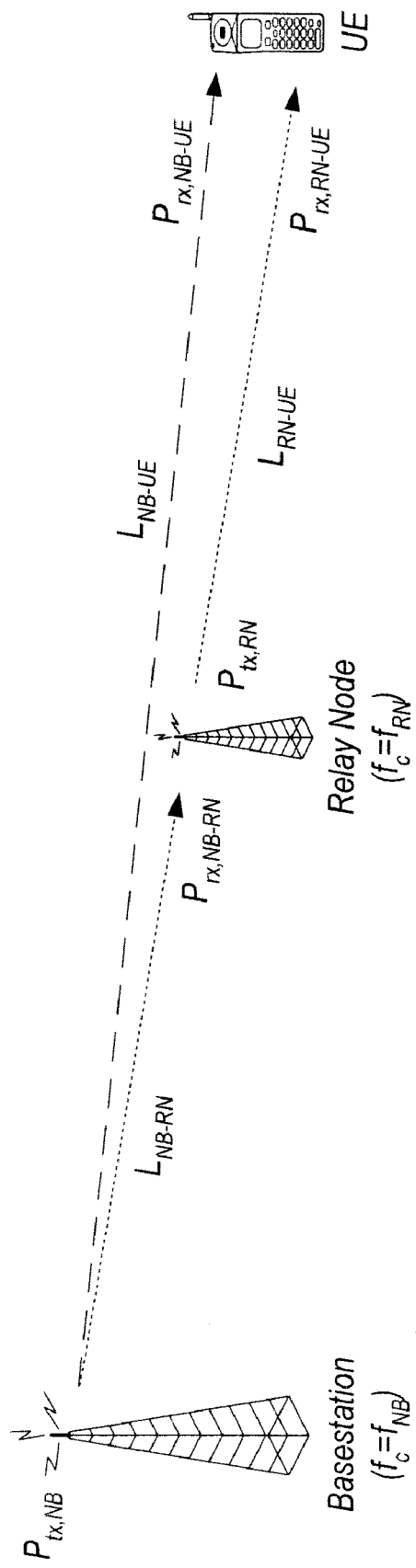
FIG. 2 shows a single-cell two-hop wireless communication system.
Figure 3A:
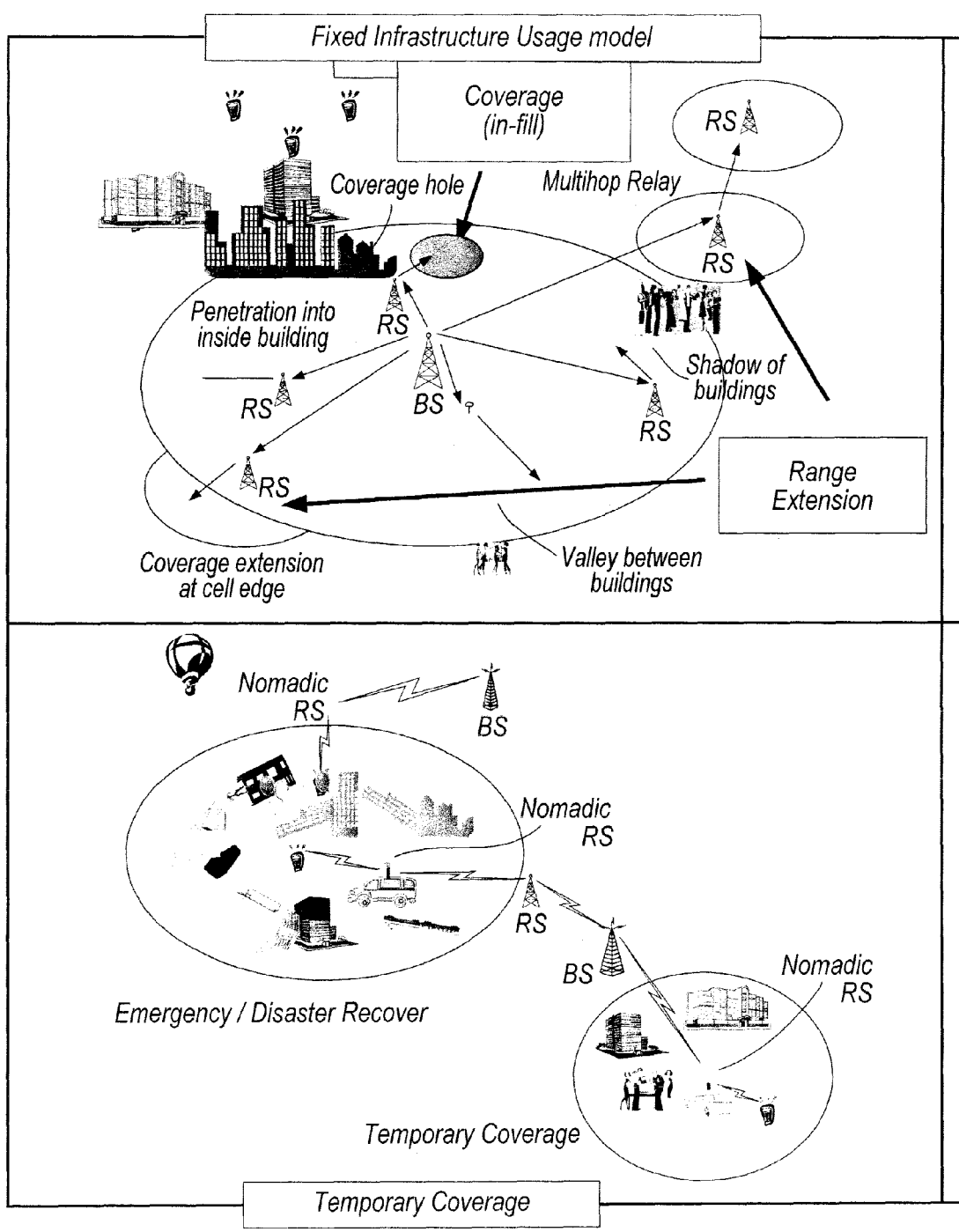
FIG. 3 shows applications of relay stations.
Figure 3B:
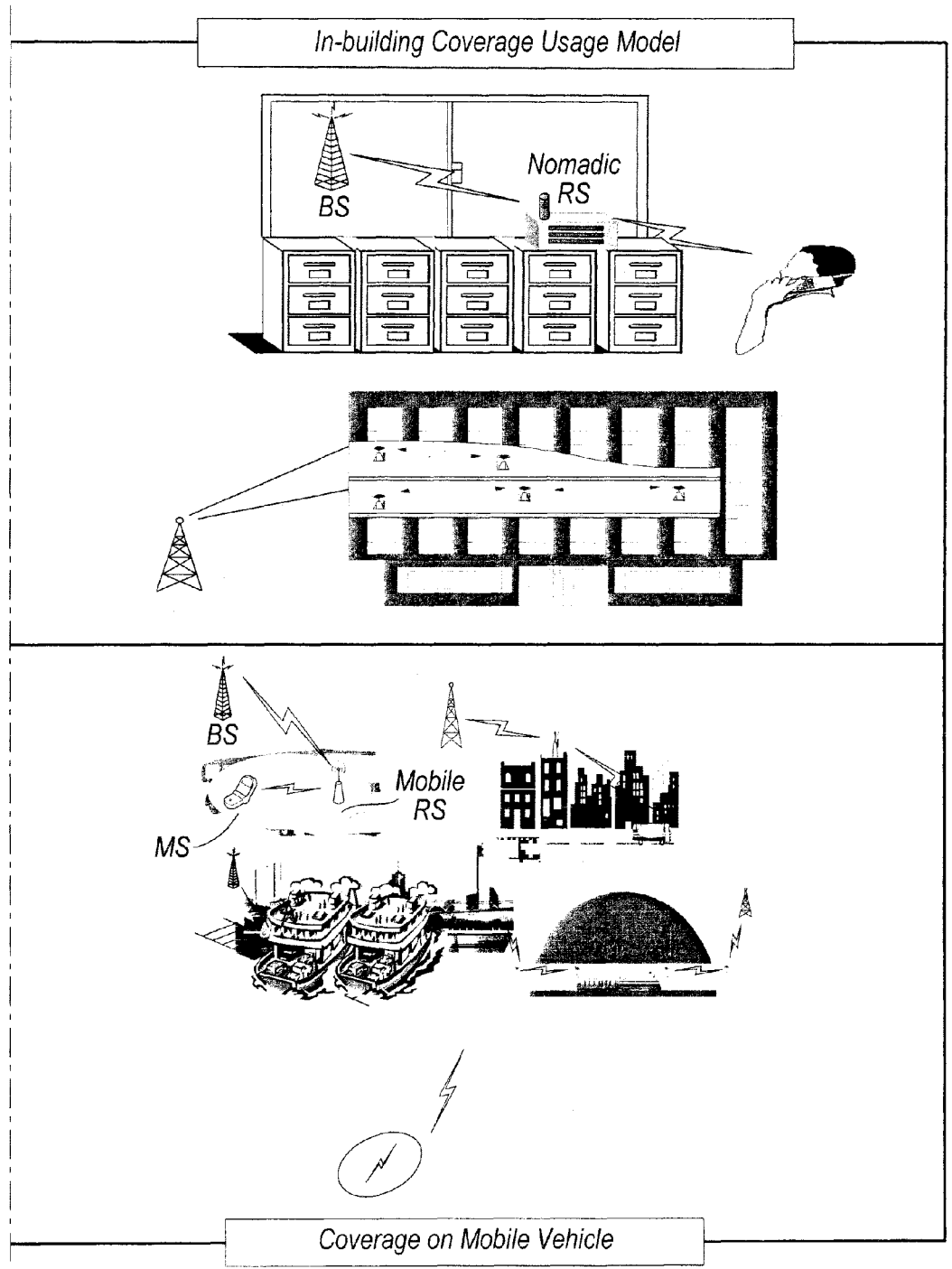
Figure 4:
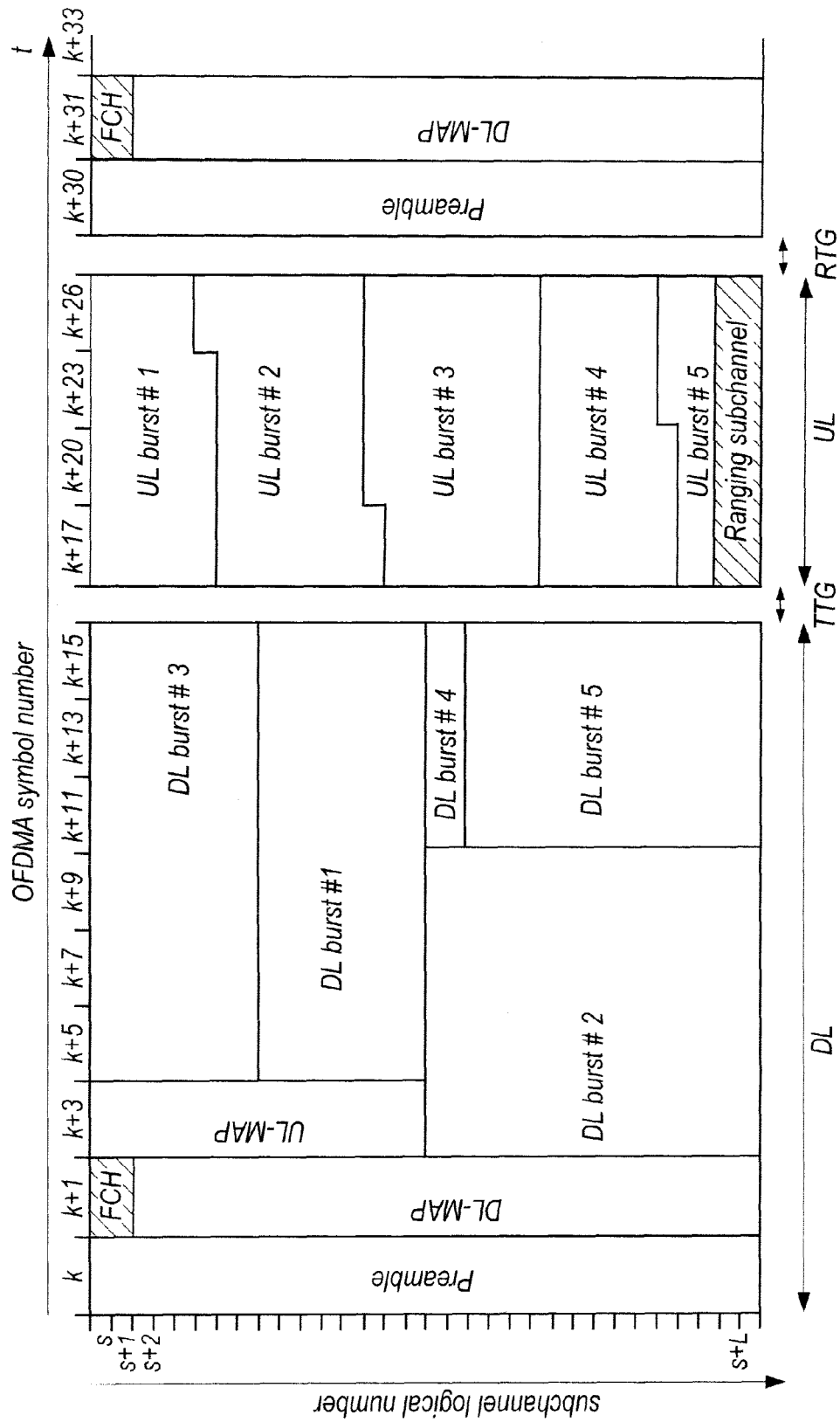
FIG. 4 shows a single hop TDD frame structure used in the OFDMA physical layer mode of the IEEE 802.16 standard.

FIGS. 1b and 1c demonstrate a type of network (or system) configuration used in embodiments of the present invention. Information is transmitted directly from a base station to a mobile station in FIG. 1b and, in the same downlink subframe, the information is transmitted indirectly from the base station to the mobile station via a relay station. The initial (first hop) transmission from the base station to the relay station and the direct transmission from the base station to the mobile station may be simultaneous or at different times, depending on the subframe format and/or type of information sent. The second hop transmission (from the relay station to the mobile station) follows the first hop transmission after the relay station turnaround. If the network does not support multihop transmission in a single subframe, the second hop transmission and any further hops could be in the subsequent downlink subframe(s). The stations are shown as a base station, relay station and mobile station. However, the particular links shown may be part of a longer communication path spanning further links so that either or both of the nodes shown as the mobile station and the base station may be relay stations.

FIG. 1c shows a network configuration in which the two alternative paths whose identical transmissions are combined are both relayed paths. Analogous considerations apply to those set out for FIG. 1b. The skilled person will appreciate the particular transmission timing factors involved.

The two network configurations illustrated show two communication paths. It is also possible for transmissions from three or more separate paths to be combined.

It should be noted that the combining of information from the alternative paths can be supplemented with retransmission according to HARQ if an error is detected. The retransmission may be along one or more of the communication paths and is recombined with previously combined information.

Wherever information is combined (from different paths and/or retransmission), the information may be encoded using the same encoding version (as per normal chase combining) or using different encoding versions to give incremental redundancy. The reader is referred to the use of either method in IEEE Standard 802.16 for an exemplary implementation.

Benefits

In summary some of the benefits of invention embodiments are:

Provision of a simple mechanism that can be adopted in a relaying aware MS that supports HARQ to improve reliability of HARQ packet reception in the case that both a direct and relayed signals (or two relayed signals) can be detected within the same frame (exploiting multihop diversity);

As a result MS/SS range can be increased or an otherwise unreliable downlink connection can be supported;

Reduction in the number of retransmissions that a BS has to make in the case of an unreliable link to achieve successful detection.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A downlink transmission method for use in a multi-hop communication system, the system comprising a source apparatus, a destination apparatus and one or more intermediate apparatuses, and the system providing two or more different communication paths extending between said source apparatus and said destination apparatus, said source apparatus being operable to transmit information indirectly to the destination apparatus along a series of links forming a first such communication path via one or more of said intermediate apparatuses and also being operable to transmit information to said destination apparatus along one link forming a second such communication path, and the intermediate apparatus or each intermediate apparatus being operable to receive information from a previous apparatus along a path and to transmit the received information to a subsequent apparatus along a path; the method comprising transmitting particular information from the source apparatus along the first communication path via one or more of said intermediate apparatuses to the destination apparatus;

transmitting the same particular information from the source apparatus along the second communication path to the destination apparatus; and combining the same particular information transmitted along the first and second communication paths in the destination apparatus, wherein the second communication path is a direct communication path and the same particular information is transmitted along the second path directly from said source apparatus to said destination apparatus.

2. The method according to claim 1, wherein the system further provides a third such communication path, said source apparatus being operable to transmit the same particular information indirectly to the destination apparatus along a series of links forming the third communication path via one or more of said intermediate apparatuses, the method further comprising transmitting the same particular information from the source apparatus along the third communication path via each of these intermediate apparatuses to the destination apparatus;

combining the same particular information transmitted along the first, second and third communication paths in the destination apparatus; and checking the combined information from the first, second and third communication paths for errors.

3. The method according to claim 1, wherein the same particular information is transmitted along both or all, as the case may be, of the said communication paths to said destination apparatus in a discrete time period for downlink transmission only, which is followed by a discrete time period for uplink transmission only; and wherein the discrete time period for downlink transmission and the discrete time period for uplink transmission are preferably a downlink sub-frame and an uplink sub-frame respectively in a time-division-duplex communication system.

4. The method according to claim 1, further comprising, before transmission of said particular information, transmitting timing information to the destination apparatus indicating when the said particular information is to be transmitted along the said communication paths.

5. The method according to claim 1 further comprising checking the combined information from the first and second communication paths for errors and preferably further comprising transmitting an error indication if an error is found and/or transmitting a positive indication if no error is found.

6. The method according to claim 5, wherein the error indication includes a request for retransmission of the particular information, the method preferably further comprising, if an error indication is transmitted, re-transmitting the particular information along one or more of said communication paths and combining the re-transmission with the previously combined information.

7. The method according to claim 5, further comprising adding an error detection sequence to said particular information before transmission and using the error detection sequence in the destination apparatus to check for errors in the combined information, wherein the error detection sequence is preferably a Cyclic Redundancy Check (CRC).

8. The method according to claim 1, wherein, before said particular information is transmitted, it is encoded.

9. The method according to claim 8, wherein said particular information is encoded with the same encoding version for each said communication path or with a different encoding version for each said communication path.

10. The method according to claim 8, further including decoding the encoded information if no errors are detected.

11. The method according to claim 8, wherein the encoding is Hybrid Automatic Repeat Request (HARQ) packet encoding and the transmissions of the same information along both or all of the communication paths, as the case may be, are treated as transmission and re-transmission(s) according to HARQ.

12. The method according to claim 1, wherein said system is an Orthogonal Frequency Division Multiplexing (OFDM) or Orthogonal Frequency Division Multiple Access (OFDMA) system.

13. The method according to claim 1, wherein said source apparatus is a base station or a relay station; wherein said destination apparatus is a user terminal or a relay station; and wherein the intermediate apparatus or each said intermediate apparatus is a relay station.

14. A multi-hop wireless communication system, the system comprising:

a source apparatus, a destination apparatus and one or more intermediate apparatuses, and the system providing two or more different downlink communication paths extending between said source apparatus and said destination apparatus, said source apparatus being operable to transmit information indirectly to the destination apparatus along a series of links forming a first such communication path via one or more of said intermediate apparatuses and also being operable to transmit information to said destination apparatus directly from said source apparatus to said destination apparatus along one link forming a second such communication path, and the intermediate apparatus or each intermediate apparatus being operable to receive information from a previous apparatus along a path and to transmit the received information to a subsequent apparatus along a path;

a transmitter operable to transmit particular information from the source apparatus along the first communication path via one or more of said intermediate apparatuses to the destination apparatus, and to transmit the same particular information from the source apparatus along the second communication path to the destination apparatus; and a soft buffer operable to combine the same particular information transmitted along the first and second communication paths in the destination apparatus.

15. A method in a destination apparatus of a multi-hop communication system, for improving reception reliability, the system comprising a source apparatus, the destination apparatus and one or more intermediate apparatuses, and the system providing two or more different downlink communication paths extending between said source apparatus and said destination apparatus, said source apparatus being operable to transmit information indirectly to the destination apparatus along a series of links forming a first such communication path via one or more of said intermediate apparatuses and also being operable to transmit information to said destination apparatus along one link forming a second such communication path, and the intermediate apparatus or each intermediate apparatus being operable to receive information from a previous apparatus along a path and to transmit the received information to a subsequent apparatus along a path; the method comprising receiving particular information transmitted from the source apparatus along the first communication path via one or more of said intermediate apparatuses;

receiving the same particular information transmitted from the source apparatus along the second communication path; and combining the same particular information transmitted along the first and second communication paths; wherein the second communication path is a direct communication path and the same particular information is transmitted along the second path directly from said source apparatus to said destination apparatus.

16. A destination apparatus of a multi-hop communication system, the system comprising a source apparatus, the destination apparatus and one or more intermediate apparatuses, and the system providing two or more different downlink communication paths extending between said source apparatus and said destination apparatus, said source apparatus being operable to transmit information indirectly to the destination apparatus along a series of links forming a first such communication path via one or more of said intermediate apparatuses and also being operable to transmit information to said destination apparatus along one link forming a second such communication path, and the intermediate apparatus or each intermediate apparatus being operable to receive information from a previous apparatus along a path and to transmit the received information to a subsequent apparatus along a path; the destination apparatus comprising a receiver operable to receive particular information transmitted from the source apparatus along the first communication path via one or more of said intermediate apparatuses to the destination apparatus, and to receive the same particular information transmitted directly from the source apparatus to the destination apparatus along one link forming the second communication path; and a soft buffer operable to combine the same particular information transmitted along the first and second communication paths in the destination apparatus.

17. A non-transitory computer-readable storage medium or a plurality of non-transitory computer-readable storage media storing a suite of computer programs which, when executed on computing devices of a multi-hop wireless communication system, causes the system to carry out a downlink transmission method, the system comprising a source apparatus, a destination apparatus and one or more intermediate apparatuses, and the system providing two or more different communication paths extending between said source apparatus and said destination apparatus, said source apparatus being operable to transmit information indirectly to the destination apparatus along a series of links forming a first such communication path via one or more of said intermediate apparatuses and also being operable to transmit information to said destination apparatus along one link forming a second such communication path, and the intermediate apparatus or each intermediate apparatus being operable to receive information from a previous apparatus along a path and to transmit the received information to a subsequent apparatus along a path; the method comprising transmitting particular information from the source apparatus along the first communication path via one or more of said intermediate apparatuses to the destination apparatus;

transmitting the same particular information from the source apparatus along the second communication path to the destination apparatus;

combining the same particular information transmitted along the first and second communication paths in the destination apparatus, wherein the second communication path is a direct communication path and the same particular information is transmitted along the second path directly from said source apparatus to said destination apparatus.

18. A non-transitory computer-readable storage medium or a plurality of non-transitory computer-readable storage media storing a computer program which, when executed on a computing device of a destination apparatus in a communication system, causes the destination apparatus to carry out a method for improving reception reliability, the system comprising a source apparatus, the destination apparatus and one or more intermediate apparatuses, and the system providing two or more different downlink communication paths extending between said source apparatus and said destination apparatus, said source apparatus being operable to transmit information indirectly to the destination apparatus along a series of links forming a first such communication path via one or more of said intermediate apparatuses and also being operable to transmit information to said destination apparatus along one link forming a second such communication path, and the intermediate apparatus or each intermediate apparatus being operable to receive information from a previous apparatus along a path and to transmit the received information to a subsequent apparatus along a path; the method comprising:

receiving particular information transmitted from the source apparatus along the first communication path via one or more of said intermediate;

receiving the same particular information transmitted from the source apparatus along the second communication path; and combining the same particular information transmitted along the first and second communication paths, wherein the second communication path is a direct communication path and the same particular information is transmitted along the second path directly from said source apparatus to said destination apparatus.

* * * * *